US007195164B2

(12) United States Patent
Patel

(10) Patent No.: US 7,195,164 B2
(45) Date of Patent: Mar. 27, 2007

(54) OPTICAL CODE READING DEVICE HAVING MORE THAN ONE IMAGING ENGINE

(75) Inventor: Mehul Patel, Fort Salonga, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/425,694

(22) Filed: Apr. 29, 2003

(65) Prior Publication Data
US 2004/0129783 A1 Jul. 8, 2004

Related U.S. Application Data

(60) Provisional application No. 60/437,959, filed on Jan. 3, 2003.

(51) Int. Cl.
*G06K 7/10* (2006.01)
(52) U.S. Cl. ............. 235/454; 235/462.32; 235/462.25
(58) Field of Classification Search ................ 235/454, 235/462.01, 462.02, 462.24, 462.25, 472.03, 235/462.32
See application file for complete search history.

(56) References Cited

U.S. PATENT DOCUMENTS

| | | | |
|---|---|---|---|
| 3,812,459 A | | 5/1974 | MacNeill et al. |
| 4,251,798 A | | 2/1981 | Swartz et al. |
| 4,578,689 A | | 3/1986 | Spencer et al. |
| 4,877,949 A | | 10/1989 | Danielson et al. |
| 5,192,856 A | | 3/1993 | Schaham |
| 5,308,966 A | | 5/1994 | Danielson et al. |
| 5,378,883 A | * | 1/1995 | Batterman et al. ..... 235/462.21 |
| 5,414,251 A | | 5/1995 | Durbin |
| 5,473,149 A | * | 12/1995 | Miwa et al. ........... 235/462.41 |

(Continued)

FOREIGN PATENT DOCUMENTS

JP 2002150215 A * 5/2002

(Continued)

OTHER PUBLICATIONS

International Search Report, Jun. 7, 2004, 6 pages.

*Primary Examiner*—Steven S. Paik
(74) *Attorney, Agent, or Firm*—Carter DeLuca Farrell & Schmidt, LLP

(57) ABSTRACT

A mobile computing device is provided having more than one imaging engine, and preferably, two imagining engines. Switching circuitry is provided for switching between the two imaging engines. Each imaging engine is optimized for use in specific applications and includes different specifications from the other imaging engine. Preferably, one imaging engine is optimized to provide higher resolution images than the other imaging engine, and one imaging engine is optimized to focus an object located 7.50 to 12.50 cm from the mobile computing device (near-to-mid range imaging), while the other imaging engine is optimized to focus an object located from 12.50 cm to infinity from the mobile computing device (mid-to-far range imaging). One imaging engine preferably includes a color image sensor, while the other imaging engine includes a black and white image sensor. The imaging engines are preferably supported by a housing of an optical code reading device configured for imaging and decoding optical codes and performing other functions, such as video teleconferencing, capturing and storing digital images, creating and transmitting video e-mail, and performing video surveillance.

69 Claims, 6 Drawing Sheets

U.S. PATENT DOCUMENTS

| | | | |
|---|---|---|---|
| 5,483,051 A * | 1/1996 | Marchi | 235/462.22 |
| 5,561,283 A | 10/1996 | Dvorkis et al. | |
| 5,576,529 A | 11/1996 | Koenck et al. | |
| 5,635,697 A | 6/1997 | Shellhammer et al. | |
| 5,640,001 A | 6/1997 | Danielson et al. | |
| 5,703,349 A | 12/1997 | Meyerson et al. | |
| 5,710,417 A | 1/1998 | Joseph et al. | |
| 5,780,831 A * | 7/1998 | Seo et al. | 235/462.1 |
| 5,796,089 A | 8/1998 | Marom | |
| 5,798,515 A | 8/1998 | Li et al. | |
| 5,814,827 A * | 9/1998 | Katz | 250/556 |
| 5,821,522 A | 10/1998 | Li et al. | |
| 5,837,987 A | 11/1998 | Koenck et al. | |
| 5,920,060 A | 7/1999 | Marom | |
| 5,992,744 A * | 11/1999 | Smith et al. | 235/462.11 |
| 6,123,264 A | 9/2000 | Li et al. | |
| 6,138,915 A | 10/2000 | Danielson et al. | |
| 6,164,546 A | 12/2000 | Kumagai et al. | |
| 6,223,988 B1 * | 5/2001 | Batterman et al. | 235/472.01 |
| 6,336,587 B1 | 1/2002 | He et al. | |
| 6,340,114 B1 | 1/2002 | Correa et al. | |
| 6,871,786 B1 * | 3/2005 | Swartz | 235/472.01 |
| 2003/0222147 A1 | 12/2003 | Havens et al. | |

FOREIGN PATENT DOCUMENTS

| | | |
|---|---|---|
| WO | 97/28512 | 8/1997 |
| WO | WO03102858 A1 | 12/2003 |
| WO | WO03102859 A1 | 12/2003 |

* cited by examiner

OPTICAL CODE READING DEVICE HAVING MORE THAN ONE IMAGING ENGINE

PRIORITY

This application claims priority to a U.S. Provisional Application filed on Jan. 3, 2003 and assigned U.S. Provisional Application Ser. No. 60/437,959, the contents of which are incorporated herein by reference.

BACKGROUND OF THE INVENTION

1. Field of the Invention

This invention relates to imaging in optical code reading devices. Aspects of the invention are particularly useful in solid state, area image sensor based, handheld code readers which are positioned at variable orientations and distances with respect to a target code. Aspects of the invention are also particularly useful in other digital, imaging devices, such personal digital assistants (PDAs), digital video cameras, scanners, pagers, video telephones, cellular telephones, hand held computers, and hand held data capture devices.

2. Description of the Related Art

Optical codes are patterns made up of image areas having different light reflective or light emissive properties, which are typically assembled in accordance with a priori rules. The term "barcode" is typically used to describe certain kinds of optical codes. The optical properties and patterns of optical codes are selected to distinguish them in appearance from the background environments in which they are used. Devices for identifying or extracting data from optical codes are sometimes referred to as "optical code readers" of which barcode scanners are one type.

Optical code readers are used in both fixed or portable installations in many diverse environments such as in stores for check-out services, in manufacturing locations for work flow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor which is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one dimensional barcode is the UPC/EAN code used to identify, for example, product inventory. An example of a two-dimensional or stacked barcode is the PDF417 barcode. Another conventional optical code is known as "MaxiCode". It consists of a central finder pattern or bull's eye center and a grid of hexagons surrounding the central finder.

It is noted that the objects of the inventions disclosed herein are applicable to optical code readers, in general, without regard to the particular type of optical codes which they are adapted to read. The invention described may also be applicable to some associated image recognition or analysis.

Most conventional scanning systems generate one or more beams of laser light which reflects off a barcode symbol and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two dimensional barcodes is disclosed in U.S. Pat. No. 5,561,283, also assigned to Symbol Technologies, Inc.

Such scanning systems are deployed in handheld units which may be manually pointed at the target. Often an individual scanner is a component of a much larger system including other scanners, computers, cabling, data terminals, etc. Such systems are frequently designed and constructed on the basis of mechanical and optical specifications for the scanning engine, sometimes called "form factors". One such form factor is the SE1200 form factor designed by Symbol Technologies, Inc.

Optical codes can also be read by employing optical code readers having an imaging engine. An imaging engine includes an image sensor having a two-dimensional array of cells or photo sensors, such as an area charge coupled device (CCD), which correspond to image elements or pixels in a field of view of the imaging engine. The imaging engine further includes a lens assembly for focusing light incident on the image sensor and associated circuitry coupled to the image sensor.

The associated circuitry produces electronic signals corresponding to a two-dimensional array of pixel information for the field of view. The electrical signals are processed by a processor for extracting information indicative of the focus quality of an image corresponding to the field of view.

An object of the present invention is to provide a more versatile optical code reader than prior art optical code readers.

Another object of the present invention is to provide a mobile computing device, and preferably, an optical code reading device, having more than one imaging engine, and preferably, two imaging engines, where each imaging engine is optimized for use in specific applications, such as reading optical codes, video teleconferencing, capturing biometric and other images, taking digital still snapshots, and capturing a sequence of digital images continuously or over a period of time (time lapse).

Another object of the present invention is to provide a mobile computing device having more than one imaging engine, where each imaging engine is capable of automatically focusing an image impinged on an image sensor and has a predetermined form factor, such as the SE900 and SE1200 form factors which are utilized in currently deployed optical code readers to increase the reliability, versatility and focusing ability of such readers.

SUMMARY OF THE INVENTION

In accordance with the present invention, a mobile computing device is provided having more than one imaging engine and associated circuitry supported by a single housing. The mobile computing device is preferably an optical code reading device with increased functionality by having more than one imaging engine with different optical specifications. The mobile computing device can also be a personal digital assistant (PDA), a digital camera, a pager, a video telephone, a cellular telephone, a hand held computer, a hand held data capture device, etc. Accordingly, each imaging engine is optimized for use in specific applications, such as reading optical codes, video teleconferencing, capturing biometric and other images, taking digital still snapshots, and capturing a sequence of digital images continuously or over a period of time (time lapse). Other applications and features include creating and transmitting video e-mail, performing video surveillance, and previewing and storing images.

Additionally, one imaging engine is optimized to provide higher resolution images than the other imaging engine by having a higher resolution photo detector array. For example, the imaging engine for use in capturing biometric images is designed to provide higher resolution images, while the imaging engine for use in reading optical codes is designed to provide lower resolution images and includes laser aiming and illumination assembly.

Further, one imaging engine is optimized to focus an object located 7.50 to 12.50 cm (focal distance) from the mobile computing device (near-to-mid range imaging), while the other imaging engine is optimized to focus an object located from 12.50 cm to infinity (focal distance) from the mobile computing device (mid-to-far range imaging). Other optical properties for each imaging engine are further contemplated, such as different depths of field and fields of view. Additionally, one imaging engine preferably includes a color image sensor, e.g., CIF (Color) CCD image sensor, while the other imaging engine includes a black and white image sensor, e.g., VGA black and white CCD image sensor.

Each imaging engine (or only one imaging engine) is capable of automatically focusing an image impinged on an image sensor by adjusting the position of at least one lens of a lens assembly of the imaging engine. It is contemplated, however, that one or both of the imaging engines are fixed focus-type imaging engines.

The mobile computing device further includes switching circuitry, such as a multiplexer, for switching between the two imaging engines. A processor within the mobile computing device is programmed with a set of instructions for automatically controlling the switching circuitry via interface logic circuitry for switching between the two imaging engines in accordance with a user-selected mode via a mode selection switch. For example, if the user selects a biometrics mode, a signal is transmitted to the processor for switching and/or using the imaging engine designed to provide a higher resolution image. If the user selects a bar code reading mode, a signal is transmitted to the processor for switching and/or using the imaging engine designed to provide a lower resolution image. Further, switching between the two imaging engines can be manually performed via an imaging engine selection switch.

Preferably, each imaging engine is configured and dimensioned to fit within a predetermined form factor, such as the SE1200 form factor which is utilized in currently deployed optical code readers for increasing the reliability, versatility and focusing ability of such readers. The SE1200 form factor occupies a space of approximately 1½ inch×1 inch×¾ inch. The predetermined form factors for placing therein each of the imaging engines can be oriented side-by-side such that the imaging engines contact each other, or in different areas of the housing such that the imaging engines do not contact each other. Therefore, the imaging engines could be two single imaging engines or two connected imaging engines. It is, however, contemplated that the two imaging engines are integrated into one imaging engine.

Embodiments are provided herein where at least one of the imaging engines is movably mounted to the housing, and where at least one of the imaging engines is removably connected to the housing. In these embodiments, the field of view of at least one of the imaging engines can be changed without moving the housing of the mobile computing device. The above and other embodiments of the invention will be described herein below with reference to the accompanying figures.

BRIEF DESCRIPTION OF THE DRAWINGS

Various embodiments of the invention will be described herein below with reference to the figures wherein.

DETAILED DESCRIPTION OF PREFERRED EMBODIMENTS

Figure 1:
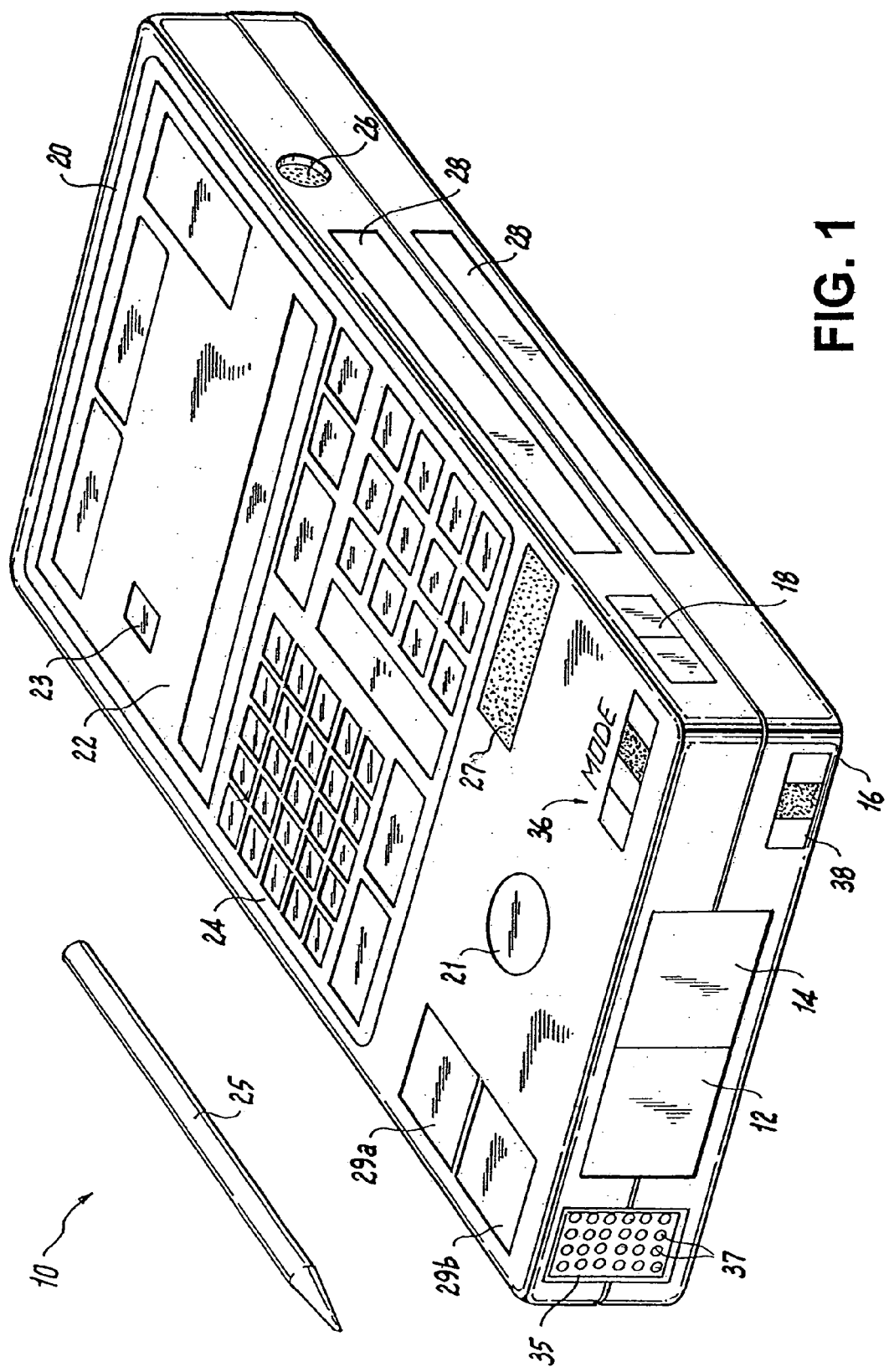
FIG. 1 is a perspective view of a mobile computing device in accordance with one embodiment of the present invention.

The present invention provides a mobile computing device and method for performing digital imaging where more than one imaging engine and associated circuitry are supported by a single housing. Embodiments are provided herein where at least one of the imaging engines is movably mounted to the housing (FIG. 4), where at least one of the imaging engines is removably connected to the housing (FIG. 5), and where at least one of the imaging engines is removably mounted to the housing (FIG. 6). In these embodiments, the field of view of at least one of the imaging engines can be changed without moving the housing of the mobile computing device.

In another embodiment, the mobile computing device is preferably an optical code reader with increased functionality by having more than one imaging engine with different optical specifications. The mobile computing device can also be (or behave as) a personal digital assistant (PDA), a digital camera, a pager, a video telephone, a cellular telephone, a hand held computer, a hand held data capture device, etc. Accordingly, each imaging engine is optimized for use in specific applications, such as reading optical codes, video teleconferencing, capturing biometric and other images, taking digital still snapshots, and capturing a sequence of digital images continuously or over a period of time (time lapse). Other applications and features include creating and transmitting video e-mail, performing video surveillance, and previewing and storing images.

Additionally, one imaging engine is optimized to provide higher resolution images than the other imaging engine by having a higher resolution photo detector array. For example, the imaging engine for use in capturing biometric images is designed to provide higher resolution images, while the imaging engine for use in reading optical codes is designed to provide lower resolution images and includes laser aiming and illumination assembly. Further, one imaging engine is optimized to focus an object located 7.50 to 12.50 cm (focal distance) from the mobile computing device (near-to-mid range imaging), while the other imaging engine is optimized to focus an object located from 12.50 cm to infinity (focal distance) from the mobile computing device (mid-to-far range imaging). Other optical properties for each imaging engine are further contemplated, such as different depths of field and fields of view. Additionally, one imaging engine preferably includes a color image sensor, e.g., CIF (Color) CCD image sensor, while the other imaging engine includes a black and white image sensor, e.g., VGA black and white CCD image sensor.

Each imaging engine (or only one imaging engine) of the mobile computing device is capable of automatically focusing an image impinged on an image sensor by adjusting the position of at least one lens of a lens assembly of the imaging engine as described in a United States application assigned U.S. application Ser. No. 10/425,344 and U.S. Provisional Application No. 60/434,519 filed on Dec. 18, 2002, the contents of both applications are incorporated herein by reference. It is contemplated, however, that one or both of the imaging engines are fixed focus-type imaging engines.

Figure 2:
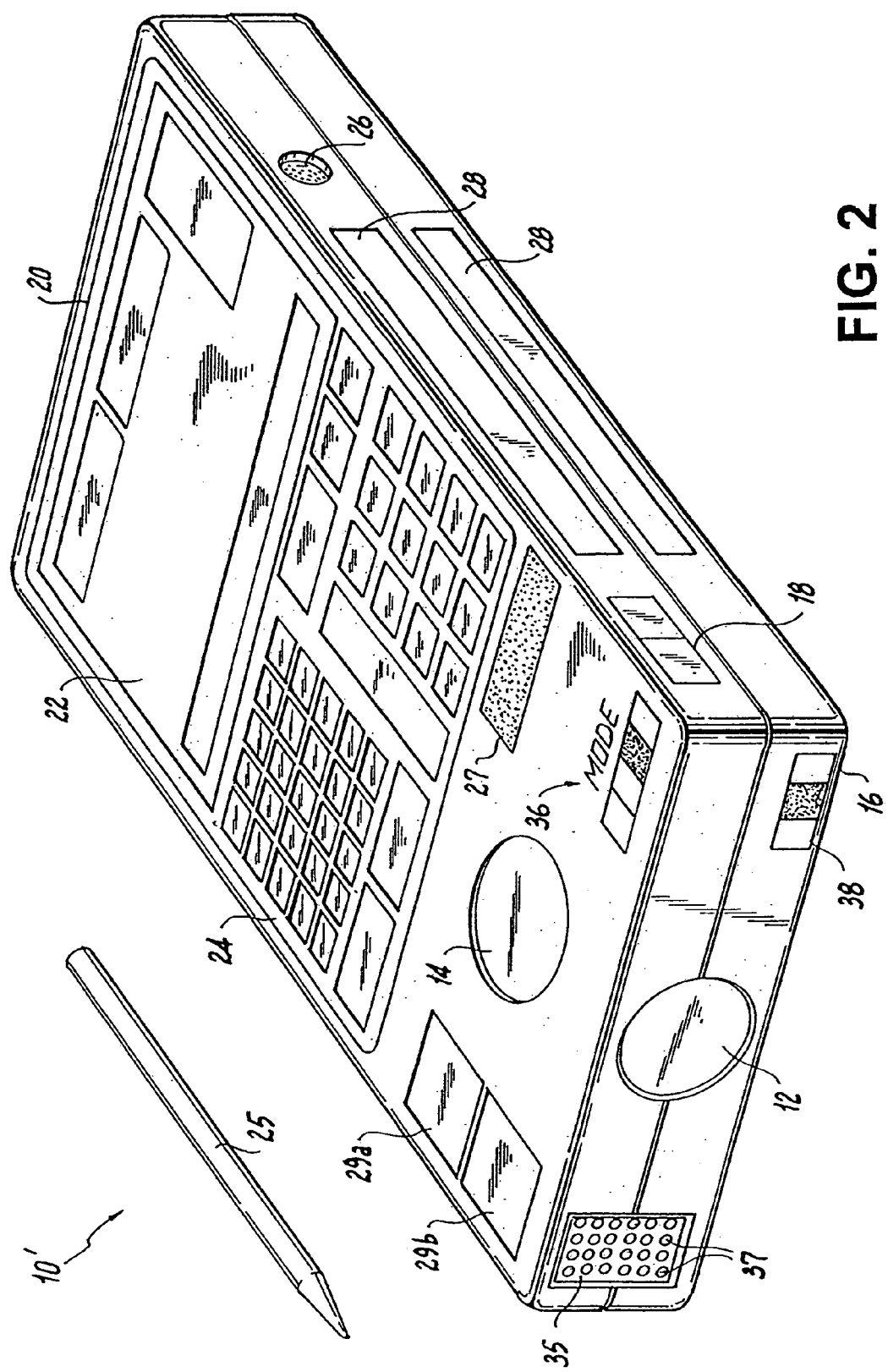
FIG. 2 is a perspective view of an optical code reader in accordance with another embodiment of the present invention.

With reference to FIGS. 1 and 2, there are shown perspective views of mobile computing devices in accordance with two embodiments of the present invention. The mobile computing devices are referenced generally by reference signs 10, 10'. Each includes two imaging engines 12, 14 having different optical specifications and supported by a housing 16, 16'. Each imaging engine is structurally equivalent by having at least one image sensor (not shown). Each image sensor includes an array of sensors for generating respective pixel data indicative of incident light on the image sensor as known in the art.

The pixel data is processed by an internal or external processor for performing image recognition and analysis or for decoding an optical code imaged by the image sensor, as known in the art. It is within the scope of the present invention that after analyzing the pixel data, if the focus quality or other parameter is outside a predetermined threshold focus range, at least one lens of a lens assembly of one of the imaging engines 12, 14 is moved by an amount determined by the processor by controllably actuating a lens guidance assembly, as disclosed in U.S. application Ser. No. 10/425,344. The pixel data can be analyzed in accordance to the methods disclosed in U.S. application Ser. No. 10/389,184, the contents of which are incorporated herein by reference.

Preferably, each imaging engine is configured and dimensioned to fit within a predetermined form factor, such as the SE1200 form factor which is utilized in currently deployed optical code readers for increasing the reliability, versatility and focusing ability of such readers. The SE1200 form factor occupies a space of approximately 1½ inch×1 inch×¾ inch.

The predetermined form factors for placing therein each of the imaging engines 12, 14 can be oriented side-by-side such that the imaging engines 12, 14 contact each other (as shown by FIG. 1), or in different areas of the housing 16 such that the imaging engines 12, 14 do not contact each other (as shown by FIG. 2). Therefore, the imaging engines 12, 14 could be two single imaging engines or two side-by-side connected imaging engines. It is, however, contemplated that the two imaging engines 12, 14 are integrated into one imaging engine. The housing 16 is preferably extremely rugged for enduring extreme temperatures and multiple drops to a hard surface, such as a concrete surface.

The mobile computing devices 10, 10' further include I/O ports 18, such as an IrDA port, a display 20, such as a glass analog resistive touch panel with an LED backlight, a graphical user interface 22, a plurality of data entry keys 24, and a power source (not shown), such as a rechargeable/replaceable lithium ion battery. The graphical user interface 22 can be used to initiate the execution of software applications to perform various functions, such as view live or recorded images obtained by the imaging engines 12, 14, wirelessly access the Internet or other network, check e-mail messages, compose a document, etc.

The data entry keys 24 are used to dial a telephone number when the mobile computing devices 10, 10' are used as a cellular telephone, and to search the Internet when the mobile computing devices 10, 10' are used as an Internet access device. Images obtained by the mobile computing devices 10, 10' can be transmitted via the Internet or other network, such as paging and cellular networks. Accordingly, communication features, such as an antenna, phone and Ethernet jacks, an ISP, and a modem, for providing wireless communications via at least one of a plurality of communication protocols, such as CDMA, TDMA, GSM, IEEE 802.11, Bluetooth, IMT 2000, CDMA2000, etc., are provided to the mobile computing devices 10, 10'.

Other features of the mobile computing devices 10, 10' include a writing stylus 25 for communicating with the graphical user interface 22, a microphone 26, a speaker 27, card slots 28, scan triggers 29a, 29b for triggering the two imaging engines 12, 14, respectively, and an AC-DC converter (not shown) for powering the devices 10, 10' using an AC outlet. The mobile computing device 10 also includes a cursor control device 21, such as a mouse, for controlling a cursor 23 displayed by the graphical user interface 22, and an aiming and illumination assembly 35. The aiming and illumination assembly 35 includes a plurality of lighting sources 37, such as laser LEDs, and can be integrated with one of the imaging engines 12, 14.

Figure 3:
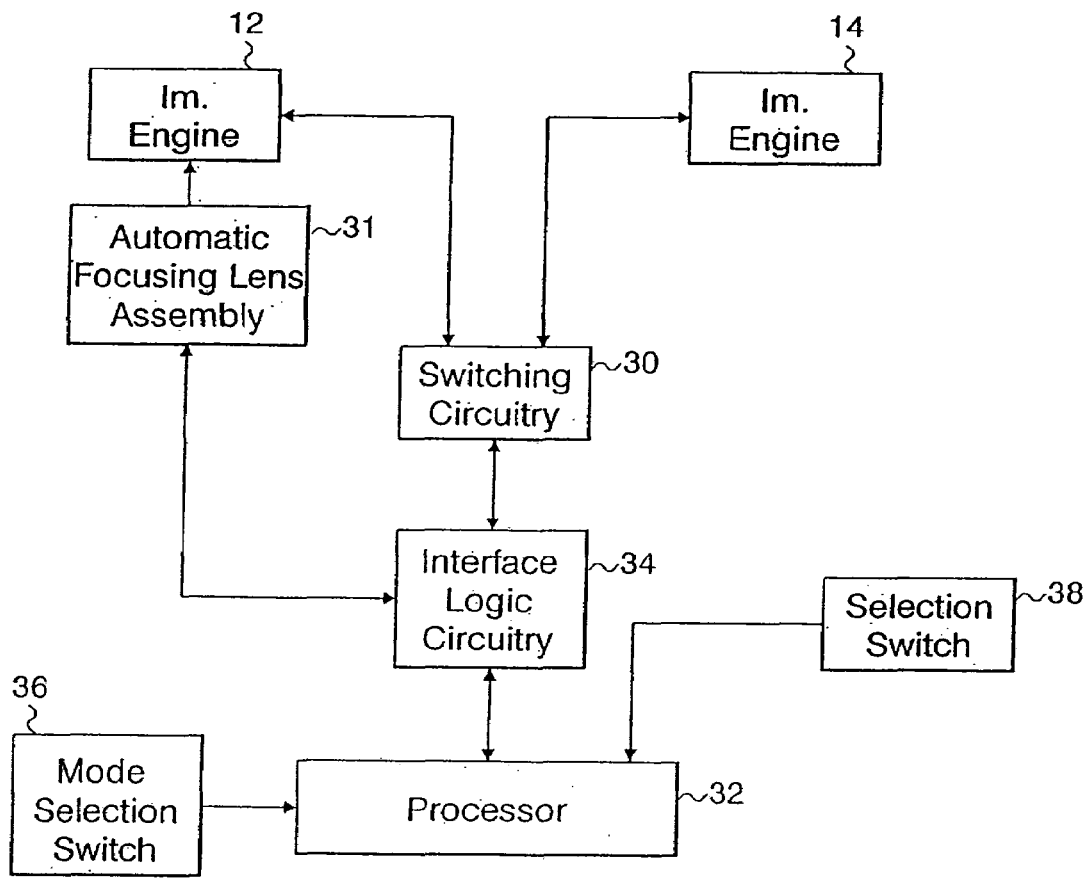
FIG. 3 is a block diagram of the mobile computing devices of FIGS. 1 and 2.

The mobile computing devices 10, 10' further includes an automatic focusing lens assembly 31 for automatically controlling movement of at least one lens of a lens assembly of imaging engine 12, as shown by FIG. 3, to focus an image impinged on an image sensor, such as a CCD image sensor, of the imaging engine 12. It is contemplated that an automatic focusing lens assembly 31 can be provided for automatically controlling movement of at least one lens of a lens assembly of both imaging engines 12, 14.

It is further contemplated that the automatic focusing lens assembly 31 can be configured for manually moving the at least one lens of the lens assembly of the imaging engine 12 for manually focusing the image impinged on the image sensor. Further still, it is contemplated that the automatic focusing lens assembly 31 is integrated with the imaging engine 12, and the integrated focusing lens assembly and imaging engine is dimensioned to fit within a predetermined form factor.

All of the various functions of the mobile computing devices 10, 10', including the selection and triggering of one of the imaging engines 12, 14 for imaging and the automatic control of the automatic focusing lens assembly 31, are performed by executing source code stored within at least one processor, such as processor 32 shown by FIG. 3, of the mobile computing devices 10, 10', or by other methods as known in the art. The mobile computing devices 10, 10' further include an operating system executed by the at least one processor.

FIG. 3 is a block diagram of the mobile computing devices 10, 10'. Each imaging engine 12, 14 is connected to switching circuitry 30 which in turn is connected to a processor 32 via interface logic circuitry 34. The processor 32 controls the switching between the two imaging engines 12, 14 depending on the particular application the mobile computing device 10, 10' is performing or the operating mode the mobile computing device 10, 10' is set to. The interface logic circuitry 34 receives data, such as pixel data, from the imaging engines 12, 14 and transmits the data to the processor 32 for storage and/or processing.

The processor 32 is programmed with a set of instructions for automatically controlling the switching circuitry 30 via the interface logic circuitry 34 for switching between the two imaging engines 12, 14 in accordance with a user-selected mode using a mode selection switch 36 or other selection means, such as by using the data entry keys 24. For example, if the user selects a biometrics mode, a signal is transmitted to the processor 32 for switching and/or using the imaging engine designed to provide a higher resolution image. If the user selects a bar code reading mode, a signal is transmitted to the processor 32 for switching and/or using the imaging engine designed to provide a lower resolution image. The processor 32 also controls the aiming and illumination assembly 35 in accordance with the imaging engine selected and/or the operating mode selected.

The switching circuitry 30 can also be controlled by an imaging engine selection switch 38 or other selection means, such as by using the data entry keys 24. The selection switch 38 can be switched from an "auto-select" position where the processor 32 determines which imaging engine to be used for imaging in accordance with the operational mode selected, to one of a "low resolution" position and a "high resolution" position for manually selecting one of the imaging engines 12, 14. That is, if the selection switch 38 is used to manually select "low resolution", the processor 32 selects the imaging engine providing low resolution images. If the selection switch 38 is used to manually select "high resolution", the processor 32 selects the imaging engine providing high resolution images.

The switching circuitry 30 preferably includes a multiplexer under the control of the processor 32 via the interface logic circuitry 34 for multiplexing the two sets of pixel data or signals received from the two imaging engines 12, 14 before transmitting one set of pixel data or signals to the processor 32 via the interface logic circuitry 34 for image processing, such as image recognition and analysis, and decoding.

Figure 4:
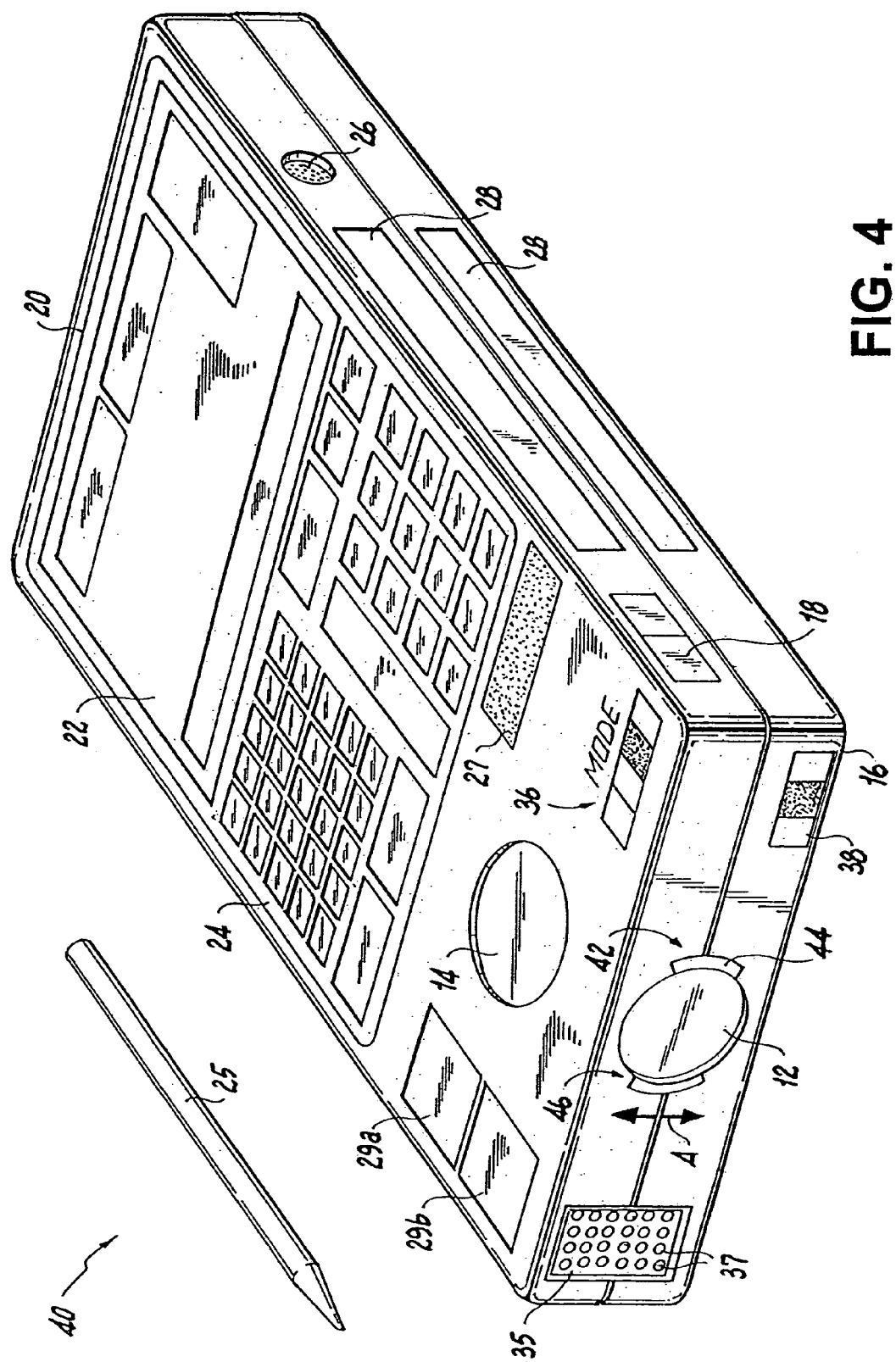
FIG. 4 is a perspective view of a mobile computing device in accordance with another embodiment of the present invention.

FIG. 4 is a perspective view of a mobile computing device designated generally by reference numeral 40. The mobile computing device 40 is similar to the mobile computing device 10 shown by FIG. 1 except that imaging engine 12 is movably mounted to the housing 16 via a pivot or swivel mechanism 42 for changing the field of view of the movable imaging engine 12 without moving the housing 16.

The swivel mechanism 42 includes a pair of mounts 44 protruding from the housing 16 and connected to the imaging engine 12 via a ball-and-socket connection 46, such that the imaging engine 12 does not touch the housing 16, in order for the imaging engine 12 to swivel in a top-down direction as shown by the arrow marked "A". Even though the swivel mechanism 42 is shown in FIG. 4 as capable of moving the imaging engine 12 in a top-down direction, the swivel mechanism 42 can be oriented on the housing 16 for moving the imaging engine 12 in a left-right direction.

Figure 5:
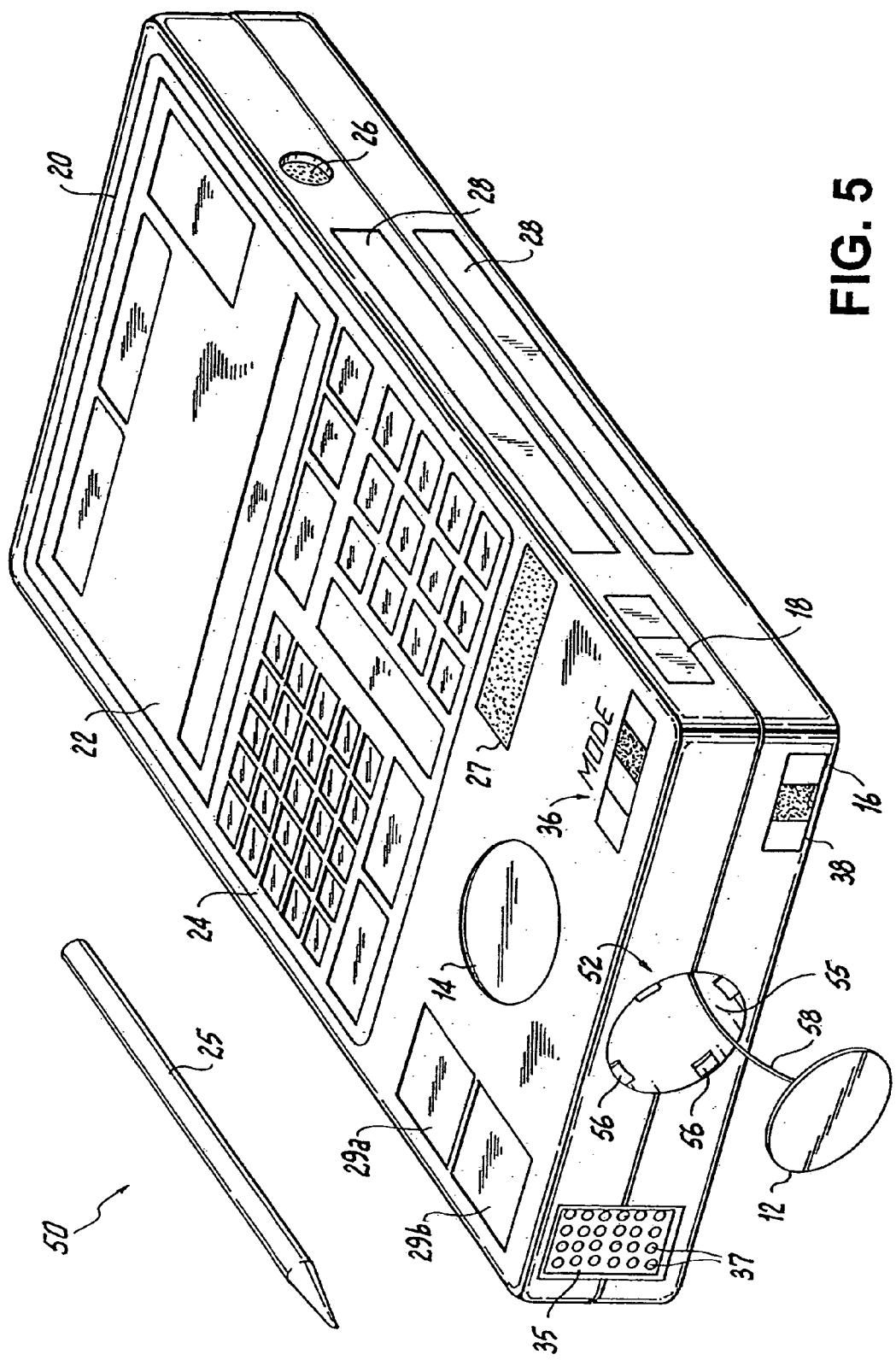
FIG. 5 is a perspective view of a mobile computing device in accordance with still another embodiment of the present invention.
Figure 6:
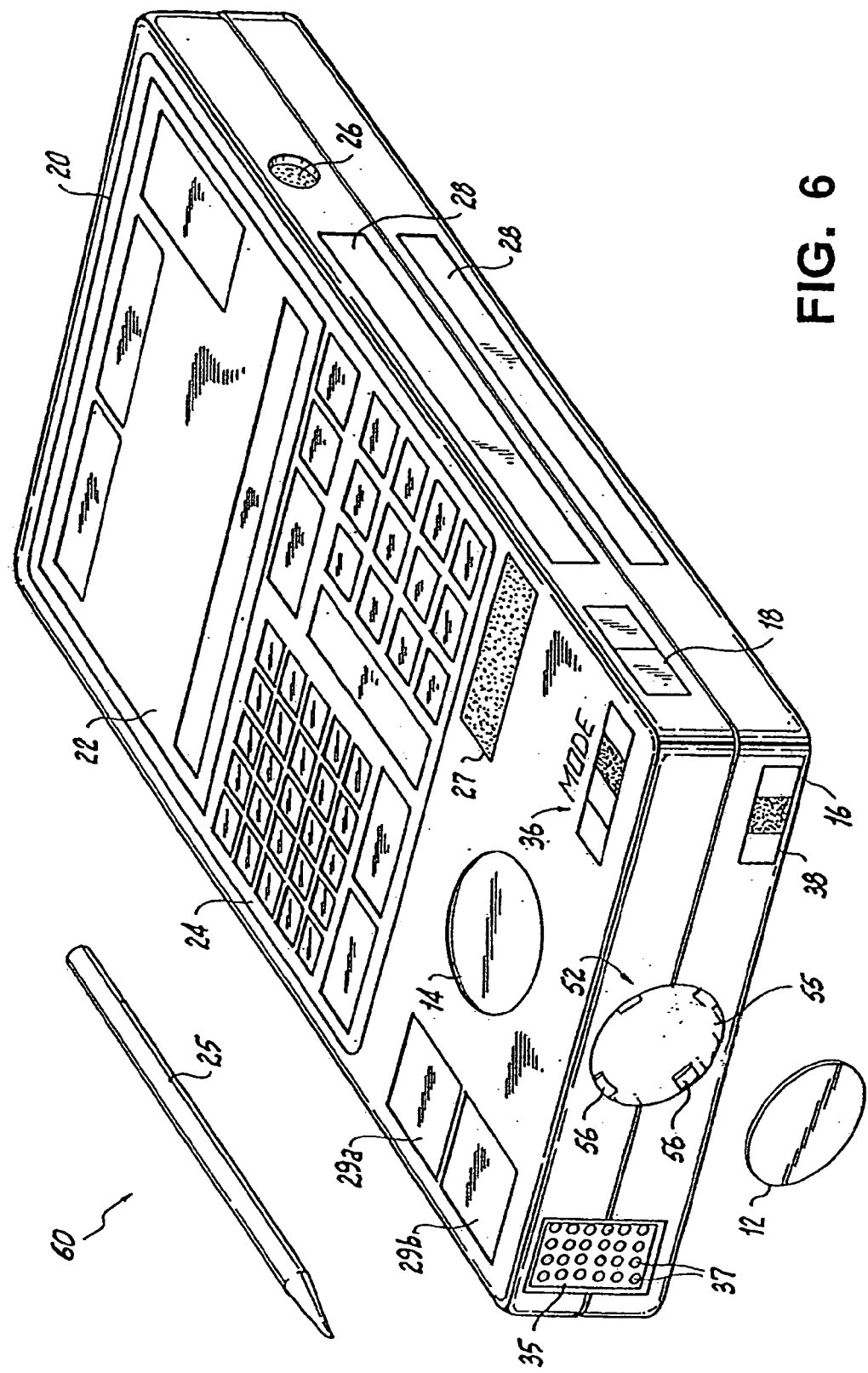
FIG. 6 is a perspective view of a mobile computing device in accordance with still another embodiment of the present invention.

FIG. 5 is a perspective view of a mobile computing device designated generally by reference numeral 50. In this embodiment, the imaging engine 12 is removably connected to the housing 16 of the mobile computing device 52 via a lock/unlock mechanism 52. The lock/unlock mechanism 54 is part of the housing 16 and it includes a space 55 for receiving the imaging engine 12 and two pairs of protrusions 56 for locking and unlocking the imagine engine 12 from the housing 16. Once the imaging engine 12 is removed from the housing 16, the imaging engine 12 maintains communication with the circuitry within the mobile computing device 50 via cable 58 which enters the housing 16. It is contemplated that imaging engine 12 can maintain communication with the circuitry via a wireless connection.

FIG. 6 is a perspective view of a mobile computing device designated generally by reference numeral 60. In this embodiment, the imaging engine 12 is removably mounted to the housing 16 of the mobile computing device 60.

In the embodiments shown by FIGS. 4 and 5, the field of view of the imaging engines 12, 14 can be changed without moving the housing 16 of the mobile computing devices 40, 50. These embodiments are useful in applications where one of the imaging engines is used to image an object in one field of view and the other imaging engine is used to simultaneously or successively image an object in another field of view. For example, in a video teleconference application, one imagining engine can be used to image a document and the other imaging engine can be used to image a conference participant.

It is contemplated that other combinations are possible to form additional embodiments within the scope of the present invention. For example, one embodiment could have one of the imaging engines movably mounted and removably connected to the housing. Another embodiment could have one imaging engine movably mounted to the housing and the other imaging engine removably connected to the housing.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

The invention claimed is:

1. A computing device comprising:
   a first imaging engine integrating in a single unit separate and apart from said computing device at least one illumination source and an image sensor for impinging an image thereon and outputting a first plurality of signals corresponding to the image impinged on the image sensor;
   a second imaging engine integrating in a single unit separate and apart from said computing device at least one illumination source and an image sensor for impinging an image thereon and outputting a second plurality of signals corresponding to the image impinged on the image sensor;
   switching circuitry for operatively switching between the first and second imaging engines;
   a processor for controlling the switching circuitry for receiving one of the first and second plurality of signals; and
   an automatically focusing lens assembly for automatically controlling movement of at least one lens of a lens assembly of at least one of the imaging engines.

2. The computing device according to claim 1, further comprising interface circuitry directly coupled to the switching circuitry and the processor for receiving the first and second plurality of signals from the switching circuitry and transmitting the signals to the processor.

3. The computing device according to claim 2, further comprising an aiming and illumination assembly controlled by the processor.

4. The computing device according to claim 2, wherein the processor includes a set of programmable instructions for processing the plurality of signals to recognize and analyze data provided therein.

5. The computing device according to claim 2, wherein the computing device is selected from the group consisting of an optical code reader, a personal digital assistant (PDA), a digital camera, a pager, a video telephone, a cellular telephone, a hand held computer, and a hand held data capture device.

6. The computing device according to claim 2, further comprising a housing, wherein the first and second imaging engines are supported by said housing.

7. The computing device according to claim 6, wherein at least one of the imaging engines is movably mounted to the housing.

8. The computing device according to claim 6, wherein at least one of the imaging engines is removably mounted to the housing.

9. The computing device according to claim 2, further comprising a user selection assembly having a first control for manually selecting at least one operating mode of the computing device, and a second control for manually selecting either the first or second imaging engine.

10. The computing device according to claim 2, wherein the first and second imaging engines are one integrated imaging engine.

11. The computing device according to claim 2, further comprising a housing having at least one cavity, wherein at least one of the first and second imaging engine is mounted within the at least one cavity.

12. The computing device according to claim 11, wherein the at least one cavity is a predetermined form factor and wherein at least one of the first and second imaging engine is configured and dimensioned to fit within said predetermined form factor.

13. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor;
switching circuitry for operatively switching between the first and second imaging engines; and
a processor for controlling the switching circuitry for receiving one of the first and second plurality of signals, wherein the first imaging engine has a near-to-mid imaging range and the second imaging engine has a mid-to-far imaging range.

14. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor;
switching circuitry for operatively switching between the first and second imaging engines; and
a processor for controlling the switching circuitry for receiving one of the first and second plurality of signals, wherein the imaging engines have at least one different depth of field and field of view.

15. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor;
switching circuitry for operatively switching between the first and second imaging engines; and
a processor for controlling the switching circuitry for receiving one of the first and second plurality of signals, wherein at least one of the image sensors is a color image sensor.

16. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor;
switching circuitry for operatively switching between the first and second imaging engines; and
a processor for controlling the switching circuitry for receiving one of the first and second plurality of signals, wherein the first image sensor provides higher resolution image than the second image sensor.

17. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor;
switching circuitry for operatively switching between the first and second imaging engines; and
a processor for controlling the switching circuitry for receiving one of the first and second plurality of signals, wherein the switching circuitry includes a multiplexer.

18. A computing device comprising:
at least two imaging engines each integrating in a single unit separate and apart from said computing device at least one illumination source and an image sensor for impinging an image thereon and outputting a plurality of signals corresponding to the image impinged on the image sensor;
switching circuitry for operatively switching between the at least two imaging engines;
a processor for controlling the switching circuitry and for processing the plurality of signals; and
an automatically focusing lens assembly for controlling movement of at least one lens of a lens assembly of at least one of the at least two imaging engines.

19. The computing device according to claim 18, further comprising interface circuitry directly coupled to the switching circuitry and the processor for receiving the plurality of signals from the switching circuitry and transmitting the signals to the processor.

20. The computing device according to claim 18, further comprising an aiming and illumination assembly controlled by the processor.

21. The computing device according to claim 18, further comprising a housing, wherein the at least two imaging engines are supported by said housing.

22. The computing device according to claim 21, wherein at least one of the at least two imaging engines is movably mounted to the housing.

23. The computing device according to claim 21, wherein at least one of the at least two imaging engines is removably mounted to the housing.

24. The computing device according to claim 21, wherein at least one of the at least two imaging engines is removably connected to the housing.

25. The computing device according to claim 18, further comprising a user selection assembly having a first control for manually selecting at least one operating mode of the computing device, and a second control for manually selecting at least one of the at least two imaging engines.

26. The computing device according to claim 18, wherein the computing device is selected from the group consisting of an optical code reader, a personal digital assistant (PDA), a digital camera, a pager, a video telephone, a cellular telephone, a hand held computer, and a hand held data capture device.

27. The computing device according to claim 18, further comprising a housing having at least one cavity, wherein at least one of the at least two imaging engines is mounted within the at least one cavity.

28. The computing device according to claim 27, wherein the at least one cavity is a predetermined form factor and wherein at least one of the at least two imaging engines is configured and dimensioned to fit within said predetermined form factor.

29. The computing device according to claim 18, wherein the at least two imaging engines are one integrated imaging engine.

30. A computing device comprising:
at least two imaging engines each integrating in a single unit separate and apart from said computing device at least one illumination source and an image sensor for impinging an image thereon and outputting a plurality of signals corresponding to the image impinged on the image sensor;
switching circuitry for operatively switching between the at least two imaging engines; and
a processor for controlling the switching circuitry and for processing the plurality of signals, wherein at least one of the at least two imaging engines has one of a near-to-mid imaging range and a mid-to-far imaging range.

31. A computing device comprising:
at least two imaging engines each integrating in a single unit separate and apart from said computing device at least one illumination source and an image sensor for impinging an image thereon and outputting a plurality of signals corresponding to the image impinged on the image sensor;
switching circuitry for operatively switching between the at least two imaging engines; and
a processor for controlling the switching circuitry and for processing the plurality of signals, wherein the at least two imaging engines have at least one different depth of field and field of view.

32. A computing device comprising:
at least two imaging engines each integrating in a single unit separate and apart from said computing device at least one illumination source and an image sensor for impinging an image thereon and outputting a plurality of signals corresponding to the image impinged on the image sensor;
switching circuitry for operatively switching between the at least two imaging engines; and
a processor for controlling the switching circuitry and for processing the plurality of signals, wherein at least one of the at least two imaging engines includes a color image sensor.

33. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor;
a processor for receiving at least one of the first and second plurality of signals; and
an automatically focusing lens assembly for controlling movement of at least one lens of a lens assembly of at least one of the imaging engines.

34. The computing device according to claim 33, further comprising switching circuitry for operatively switching between the first and second imaging engines.

35. The computing device according to claim 34, further comprising interface circuitry coupled to the switching circuitry and the processor for receiving the first and second plurality of signals from the switching circuitry and transmitting the signals to the processor.

36. The computing device according to claim 34, wherein the switching circuitry includes a multiplexer.

37. The computing device according to claim 33, further comprising an aiming and illumination assembly controlled by the processor.

38. The computing device according to claim 33, wherein the processor includes a set of programmable instructions for processing the plurality of signals to recognize and analyze data provided therein.

39. The computing device according to claim 33, wherein the computing device is selected from the group consisting of an optical code reader, a personal digital assistant (PDA), a digital camera, a pager, a video telephone, a cellular telephone, a hand held computer, and a hand held data capture device.

40. The computing device according to claim 33, further comprising a housing, wherein the first and second imaging engines are supported by said housing.

41. The computing device according to claim 40, wherein at least one of the imaging engines is movably mounted to the housing.

42. The computing device according to claim 40, wherein at least one of the imaging engines is removably mounted to the housing.

43. The computing device according to claim 40, wherein at least one of the at least two imaging engines is removably connected to the housing.

44. The computing device according to claim 33, further comprising a user selection assembly having a first control for manually selecting at least one operating mode of the computing device, and a second control for manually selecting either the first or second imaging engine.

45. The computing device according to claim 33, wherein the first and second imaging engines are one integrated imaging engine.

46. The computing device according to claim 33, further comprising a housing having at least one cavity, wherein at least one of the first and second imaging engine is mounted within the at least one cavity.

47. The computing device according to claim 46, wherein the at least one cavity is a predetermined form factor and wherein at least one of the first and second imaging engine is configured and dimensioned to fit within said predetermined form factor.

48. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor; and
a processor for receiving at least one of the first and second plurality of signals, wherein the first imaging engine has a near-to-mid imaging range and the second imaging engine has a mid-to-far imaging range.

49. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor;
a processor for receiving at least one of the first and second plurality of signals, wherein the imaging engines have at least one different depth of field and field of view.

50. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor; and
a processor for receiving at least one of the first and second plurality of signals, wherein at least one of the image sensors is a color image sensor.

51. A computing device comprising:
a first imaging engine integrating in a single unit separate and apart from said computing device at least one illumination source and an image sensor for impinging an image thereon and outputting a first plurality of signals corresponding to the image impinged on the image sensor;
a second imaging engine integrating in a single unit separate and apart from said computing device at least one illumination source and an image sensor for impinging an image thereon and outputting a second plurality of signals corresponding to the image impinged on the image sensor; and
a processor for receiving at least one of the first and second plurality of signals, wherein the first image sensor provides a higher resolution image than the second image sensor.

52. A method for performing digital imaging, the method comprising the steps of:
providing at least two imaging engines in a computing device, each imaging engine integrating in a single unit separate and apart from said computing device at least one illumination source and an image sensor for impinging an image thereon and outputting a plurality of signals corresponding to the image impinged on the image senor;
selecting at least one of the at least two imaging engines;
processing the plurality of signals corresponding to the at least one selected imaging engine; and
automatically controlling movement of a lens assembly of at least one of the at least two imaging engines.

53. The method according to claim 52, wherein the step of selecting is performed either automatically or manually.

54. The method according to claim 52, wherein the step of processing includes the step of decoding at least one optical code provided by the plurality of signals.

55. The method according to claim 52, further comprising the steps of:
providing a housing having at least one cavity; and
mounting at least one of the at least two imaging engines within the at least one cavity.

56. The method according to claim 55, wherein the at least one cavity is a predetermined form factor and wherein the step of providing at least two imaging engines includes the step of providing at least one imaging engine configured and dimensioned to fit within said predetermined form factor.

57. A computing device comprising:
a housing defining at least one cavity;
a first imaging engine mounted in said at least one cavity and integrating in a single unit separate and apart from said computing device an image sensor for impinging an image thereon and outputting a first plurality of signals corresponding to the image impinged on the image sensor and at least one illumination source;

a second imaging engine mounted in said at least one cavity and integrating in a single unit separate and apart from said computing device an image sensor for impinging an image thereon and outputting a second plurality of signals corresponding to the image impinged on the image sensor;

switching circuitry for operatively switching between the first and second imaging engines; and a processor for controlling the switching circuitry for receiving one of the first and second plurality of signals, wherein the first imaging engine has a near-to-mid imaging range and the second imaging engine has a mid-to-far imaging range.

58. The computing device according to claim 57, wherein at least one of the imaging engines is removably connected to the housing.

59. The computing device according to claim 57, wherein the first and second imaging engines are one integrated imaging engine.

60. The computing device according to claim 57, further comprising an automatically focusing lens assembly for automatically controlling movement of at least one lens of a lens assembly of at least one of the imaging engines.

61. The computing device according to claim 57, wherein the imaging engines have at least one different depth of field and field of view.

62. The computing device according to claim 57, wherein at least one of the image sensors is a color image sensor.

63. The computing device according to claim 57, wherein the image sensor of the first imaging engine provides a higher resolution image than second image sensor of the second imaging engine.

64. The computing device according to claim 57, further comprising an aiming and illumination assembly controlled by the processor.

65. The computing device according to claim 57, wherein the switching circuitry includes a multiplexer.

66. The computing device according to claim 57, wherein the computing device is selected from the group consisting of an optical code reader, a personal digital assistant (PDA), a digital camera, a pager, a video telephone, a cellular telephone, a hand held computer, and a hand held data capture device.

67. The computing device according to claim 57, wherein at least one of the imaging engines is movably mounted to the housing.

68. The computing device according to claim 57, wherein at least one of the imaging engines is removably mounted to the housing.

69. The computing device according to claim 57, further comprising a user selection assembly having a first control for manually selecting at least one operating mode of the computing device, and a second control for manually selecting either the first or second imaging engine.

* * * * *